Patented Sept. 29, 1936

2,055,812

UNITED STATES PATENT OFFICE 2,055,812

PRESERVATION OF RUBBER

David J. Beaver, Nitro, W. Va., assignor, by mesne assignments, to Monsanto Chemical Company, Wilmington, Del., a corporation of Delaware No Drawing. Application December 22, 1933, Serial No. 703,601

16 Claims. (Cl. 18—50)

This invention relates to the manufacture of rubber and rubber-like compounds and it has particular relation to the manufacture of compounds of that character which are exposed to the effects of light, heat and oxygen.

The object of the invention is to provide a rubber compound which offers particular high resistance to the above deterioration agencies thereby extending the period of usefulness thereof.

Heretofore, it has been observed that rubber and rubber-like materials, such as balata or gutta percha upon exposure to light, air or heat either alone or in combination, tended quickly to harden or lose their tensile strength and elasticity thereby becoming unfit for further service. It has been proposed to overcome these effects by incorporating into the rubber or rubber-like compounds certain organic materials termed "anti-oxidants" or age resisters. The chief object of this invention, then, is to provide a new and superior class of age resisters or antioxidants.

The substances which are employed as antioxidants or age resisters according to the present invention are reaction products of ketones and aldehydes, and may conveniently be prepared in the presence of an acid condensing agent in the manner indicated by Wallach, Berichte der deutschen Chemische Gesellschaft, vol 40, pages 70–71 (1907).

For example, the following materials are typical members of the class of substances outlined above: reaction product of acetone and acetaldehyde, reaction product of di-isopropyl ketone and butyl aldehyde, reaction product of cyclohexanone and formaldehyde, reaction product of methyl cyclohexanone and butyl aldehyde, reaction product of fenchone and formaldehyde, reaction product of cyclohexanone and furfural, reaction product of methyl isobutyl ketone and formaldehyde and the reaction product of cyclohexanone and butyl aldehyde.

Any one or a mixture of the above-enumerated substances or of these substances with other known antioxidants may be incorporated into rubber with good effect on its age resisting properties.

One method whereby the preferred class of materials, for example the reaction product of cyclohexanone and butyraldehyde, was prepared comprises the following: 98 parts by weight of cyclohexanone (one molecular proportion) and 144 parts by weight of butyraldehyde (two molecular proportions) were placed in a suitable reactor, the mixture cooled to substantially 10° C. and saturated with hydrochloric acid gas and maintained at a temperature of substantially 10 to 15° C. for substantially four hours. Considerable heat was evolved during the reaction. On completion of the reaction the reaction product was gradually warmed to substantially 60 to 65° C. in order to drive off any hydrochloric acid gas occluded therein and then dissolved in a convenient solvent, for example benzene, and washed free of acid. The solvent was removed from the reaction product by a convenient means, as for example, by evaporation or distillation. The residue comprising the preferred product is a dark red liquid with a sharp odor and possesses marked antioxidant properties. If convenient or desirable the residue described above may be further purified by distilling at reduced pressure. Other methods of preparing the preferred class of materials may be employed and are obvious to those skilled in the art. For example, if convenient or desirable, other catalysts may be employed.

As a specific example of one embodiment of the present invention, a rubber stock was compounded comprising

| | Parts |
|---|---|
| Pale crepe rubber | 100 |
| Zinc oxide | 60 |
| Lithopone | 20 |
| Sulfur | 2 |
| The reaction product of benzoyl chloride and mercaptobenzothiazole | 0.825 |
| Diphenyl guanidine phthalate | 0.675 |
| Paraffin | 0.25 |
| Reaction product of butyraldehyde and cyclohexanone | 1.0 |

The rubber stock so compounded was then vulcanized by heating sheets of the stock in the usual manner for different periods of time in a press maintained at the temperature of twenty pounds of steam pressure per square inch (that is 258° F.). Portions of the stock cured as set forth were then artificially aged by heating said stock in the Bierer-Davis oxygen bomb for 120 hours at a temperature of 70° C. and under a pressure of 300 pounds of oxygen per square inch. The results obtained on testing the aged and unaged stocks follow:

Table I

| Cure | | | Modulus of elasticity in lbs/in² at elongations of 500% | Tensile at break in lbs/in² | Ult. elong. % |
|---|---|---|---|---|---|
| Time mins. | Lbs. steam pressure | Hours aged | | | |
| 30 | 20 | 0 | 1775 | 4070 | 715 |
| 30 | 20 | 120 | 2140 | 3810 | 650 |
| 45 | 20 | 0 | 1955 | 4220 | 700 |
| 45 | 20 | 120 | 2335 | 3815 | 630 |
| 60 | 20 | 0 | 2005 | 4210 | 675 |
| 60 | 20 | 120 | 2245 | 3695 | 630 |

From the data set forth in Table I it is shown that the new and preferred class of materials, for example the reaction product of butyraldehyde and cyclohexanone, comprise an important class of rubber antioxidants or age resisters.

Many of the antioxidants heretofore employed cannot be used in white colored stocks for the reason that darkening of the stocks takes place either in the vulcanization step or on exposure to sunlight or ultra violet light or both. The new and preferred class of antioxidants possesses the added advantage in that white stocks wherein they are incorporated are markedly resistant to the discoloring influence of both sunlight and ultra violet light. Thus, as one example showing this added very desirable characteristic of the preferred class of compounds, strips of each of the three cures of the above unaged cured rubber stock were exposed to ultra violet light rays generated by a mercury arc light maintained nine inches from the rubber test strips. After 30 hours exposure in the manner described the rubber test strips containing the preferred class of antioxidants, for example the reaction product of cyclohexanone and butyraldehyde, showed substantially no discoloration.

Other members of the preferred class of antioxidants have been prepared in a manner analogous to that by which the reaction product of butyraldehyde and cyclohexanone described above has been prepared. Thus, 100 parts by weight of methyl isobutyl ketone (substantially one molecular proportion) and 200 parts by weight of 40% aqueous formaldehyde solution (substantially 33% excess over two molecular proportions) were placed in a suitable reactor, cooled to substantially 10 to 15° C. and hydrochloric acid gas passed thereinto. The reaction mixture was then heated to substantially 80 to 85° C. while further passing thereinto hydrochloric acid gas. After completion of the reaction, the reaction product so produced was dissolved in a suitable solvent, for example benzene, and washed with water until neutral, the solvent eliminated and the residue distilled. A light yellowish-green liquid was obtained distilling at substantially 126 to 132° C. at 5 mm. pressure of mercury. The reaction product produced as described above was incorporated in the usual manner in a rubber stock comprising

| | Parts |
|---|---|
| Pale crepe rubber | 100 |
| Zinc oxide | 60 |
| Lithopone | 20 |
| Sulfur | 2 |
| Paraffin | 0.25 |
| The reaction product of benzoyl chloride and mercaptobenzothiazole | 0.825 |
| Diphenyl guanidine phthalate | 0.675 |
| The reaction product of methyl iso butyl ketone and formaldehyde | 1.0 |

The compounded rubber stock was vulcanized by heating in a press for different periods of time maintained at the temperature of twenty pounds of steam pressure per square inch (that is 258° F.). Portions of the stock cured as set forth were then artificially aged by heating in the Bierer-Davis oxygen bomb for 120 hours at a temperature of 70° C. and under a pressure of 300 pounds of oxygen per square inch. The modulus and tensile characteristics of the unaged and aged rubber stocks follow:

Table II

| Cure | | | Modulus of elasticity in lbs/in² at elongations of 500% | Tensile at break in lbs/in² | Ult. elong. % |
|---|---|---|---|---|---|
| Time mins. | Lbs. steam pressure | Hours aged | | | |
| 30 | 20 | 0 | 1645 | 3580 | 700 |
| 30 | 20 | 120 | 2015 | 3360 | 640 |
| 45 | 20 | 0 | 1840 | 3975 | 695 |
| 45 | 20 | 120 | 2220 | 3515 | 625 |
| 60 | 20 | 0 | 1980 | 4000 | 680 |
| 60 | 20 | 120 | 2200 | 3580 | 635 |

The data set forth in Table II further shows the desirable age resisting properties of the new and preferred class of organic compounds, as even on undergoing the exaggerated aging conditions of 120 hours in the oxygen bomb, the rubber stocks employing said antioxidants have undergone very little change.

Furthermore, on subjecting strips of each of the three cures of the above unaged rubber stocks to ultra violet light rays generated by a mercury arc light maintained nine inches from the rubber strips for 30 hours, they showed substantially no discoloration.

As a further embodiment of the present invention 152 parts by weight of fenchone (one molecular proportion) and 200 parts by weight of a 40% aqueous formaldehyde solution (substantially 33% excess over two molecular proportions) were placed in a suitable reactor, a convenient quantity of ethyl alcohol added thereto, and the solution saturated with hydrochloric acid gas for substantially six hours at substantially 10 to 15° C. The reaction mixture was allowed to warm to room temperature and maintained thereat for substantially fifteen hours, after which it was dissolved in an additional quantity of a suitable solvent, for example benzene and after neutralizing and washing with water, the solvent was removed therefrom as for example by distillation. The residue comprising the crude reaction product may be purified, if desired, by distilling at atmospheric pressure, whereupon a dark brown liquid having a boiling range of substantially 187 to 195° C. is obtained. The reaction product prepared as described was incorporated in the rubber stock hereinafter set forth.

As a still further embodiment of the present invention, 98 parts by weight of cyclohexanone (one molecular proportion) and 200 parts by weight of a 40% aqueous formaldehyde solution (substantially a 33% excess over two molecular proportions) were placed in a convenient vessel and saturated with hydrochloric acid gas at a temperature of substantially 15 to 20° C. The reaction mixture was thereafter maintained at a temperature of substantially 20 to 30° C. until the reaction was apparently completed, after which the reaction product was dissolved in the necessary quantity of a suitable solvent, for example benzene, washed with water until free of acid, and the solvent removed therefrom preferably by distillation. The residue, a dark colored viscous liquid, was incorporated in the rubber stock given below.

|  | Stock A | Stock B |
|---|---|---|
| Pale crepe rubber | 100 | 100 |
| Zinc oxide | 60 | 60 |
| Lithopone | 20 | 20 |
| Sulfur | 2 | 2 |
| Paraffin | 0.25 | 0.25 |
| Reaction product of benzoyl chloride and mercaptobenzothiazole | 0.825 | 0.825 |
| Diphenyl guanidine phthalate | 0.675 | 0.675 |
| Reaction product of fenchone and formaldehyde | 1.0 |  |
| Reaction product of cyclohexanone and formaldehyde |  | 1.00 |

The rubber stocks so compounded were vulcanized and the cured rubber product aged in the Bierer-Davis oxygen bomb at a temperature of 70° C. and under 300 pounds of oxygen pressure per square inch. The results obtained on testing the aged and unaged cured rubber stocks are given in Table III.

Table III

| Stock | Cure | | | Modulus of elasticity in lbs/in² at elongations of 500% | Tensile at break in lbs/in² | Ult. elong. % |
|---|---|---|---|---|---|---|
|  | Time mins. | Lbs. steam press. | Hrs. aged |  |  |  |
| A | 30 | 20 | 0 | 1825 | 4160 | 720 |
| A | 30 | 20 | 120 | 2140 | 3715 | 655 |
| B | 30 | 20 | 0 | 1700 | 3820 | 700 |
| B | 30 | 20 | 120 | 1785 | 3490 | 680 |
| A | 45 | 20 | 0 | 1995 | 3990 | 675 |
| A | 45 | 20 | 120 | 2220 | 3835 | 655 |
| B | 45 | 20 | 0 | 1895 | 4110 | 685 |
| B | 45 | 20 | 120 | 2105 | 3640 | 650 |
| A | 60 | 20 | 0 | 2050 | 4035 | 665 |
| A | 60 | 20 | 120 | 2185 | 3490 | 630 |
| B | 60 | 20 | 0 | 2000 | 4135 | 690 |
| B | 60 | 20 | 120 | 2045 | 3460 | 640 |

Portions of the above unaged vulcanized rubber stocks, wherein the reaction product of fenchone and formaldehyde and the reaction product of cyclohexanone and formaldehyde were incorporated as antioxidants, showed substantially no discoloration on subjecting to the ultra violet light rays produced by the mercury arc in the manner employed in testing the reaction product of butyraldehyde and cyclohexanone described above.

The reaction product of cyclohexanone and furfural has also been prepared by reacting substantially one molecular proportion of cyclohexanone with substantially two molecular proportions of furfuraldehyde in the presence of hydrochloric acid gas as a catalyst. The product prepared as described on incorporating in a typical rubber stock was also found to possess desirable antioxidant properties.

From the data hereinbefore set forth, it is shown that rubber compositions containing small proportions of the preferred class of materials markedly resist the deterioration influences of light, heat and oxygen.

Obviously, the practice of this invention is not limited to the specific compositions given above, such compositions being merely illustrative of the manner of employing the antioxidant or age resistors of this invention. The antioxidant or age resisters may be employed in conjunction with other vulcanizing agents than those specifically disclosed, for this invention is applicable generally to pure rubber or rubber compositions of the most varied nature.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta-percha, rubber isomers and like products, whether or not admixed with fillers, pigments, vulcanizing or accelerating agents.

The present invention is limited solely by the claims attached hereto as a part of the present specification.

What is claimed is:

1. The method of preserving rubber which comprises treating rubber with a reaction product obtainable by reacting in the presence of an acid condensation agent substantially two molecular proportions of an aliphatic aldehyde and substantially one molecular proportion of a ketone having the formula of

wherein R may be alkyl or alkylene groups, said alkylene groups being joined to form an isocyclic six membered ring.

2. The method of preserving rubber which comprises treating rubber with a reaction product obtainable by reacting in the presence of an acid condensation agent substantially two molecular proportions of an aliphatic aldehyde and substantially one molecular proportion of a cyclohexanone.

3. The method of preserving rubber which comprises treating rubber with a reaction product obtainable by reacting in the presence of an acid condensation agent substantially two molecular proportions of an aliphatic aldehyde and substantially one molecular proportion of cyclohexanone.

4. The method of preserving rubber which comprises treating rubber with a reaction product obtainable by reacting in the presence of an acid condensation agent substantially two molecular proportions of an aliphatic aldehyde and substantially one molecular proportion of methyl iso butyl ketone.

5. The method of preserving rubber which comprises treating rubber with a reaction product of substantially two molecular proportions of butyraldehyde and substantially one molecular proportion of cyclohexanone prepared in the presence of hydrochloric acid at a temperature of substantially 10° C. to 85° C.

6. The method of preserving rubber which comprises treating rubber with a reaction product of substantially two molecular proportions of formaldehyde and substantially one molecular proportion of cyclohexanone prepared in the presence of hydrochloric acid at a temperature of substantially 10° C. to 85° C.

7. The method of preserving rubber which comprises treating rubber with a reaction product of substantially two molecular proportions of formaldehyde and substantially one molecular proportion of methyl iso butyl ketone prepared in the presence of hydrochloric acid at a temperature of substantially 10° C. to 85° C.

8. The vulcanized rubber product produced by heating rubber and sulfur in the presence of a reaction product obtainable by reacting in the presence of an acid condensation agent substantially two molecular proportions of an aliphatic aldehyde and substantially one molecular proportion of cyclohexanone.

9. The vulcanized rubber product produced by heating rubber and sulfur in the presence of a reaction product obtainable by reacting in the presence of an acid condensation agent substantially two molecular proportions of butyraldehyde and substantially one molecular proportion of cyclohexanone.

10. The vulcanized rubber product produced by heating rubber and sulfur in the presence of a reaction product obtainable by reacting in the presence of an acid condensation agent substantially two molecular proportions of formaldehyde and substantially one molecular proportion of cyclohexanone.

11. The vulcanized rubber product produced by heating rubber and sulfur in the presence of a reaction product obtainable by reacting in the presence of an acid condensation agent substantially two molecular proportions of formaldehyde and substantially one molecular proportion of methyl iso butyl ketone.

12. The vulcanized rubber product produced by heating rubber and sulfur in the presence of a reaction product obtainable by reacting in the presence of an acid condensing agent substantially two molecular proportions of an aliphatic aldehyde and substantially one molecular proportion of a ketone having the formula of

wherein R may be alkyl or alkylene groups, said alkylene groups being joined to form an isocyclic six membered ring.

13. The vulcanized rubber product produced by heating rubber and sulfur in the presence of a reaction product obtainable by reacting in the presence of an acid condensation agent substantially two molecular proportions of an aliphatic aldehyde and substantially one molecular proportion of a cyclohexanone.

14. The method of preserving rubber which comprises treating rubber with a reaction product obtainable by reacting in the presence of an acid condensation agent substantially two molecular proportions of an aliphatic aldehyde and substantially one molecular proportion of an isocyclic saturated ketone containing a six membered carbon ring.

15. The vulcanized rubber product produced by heating rubber and sulfur in the presence of a reaction product obtainable by reacting in the presence of an acid condensation agent substantially two molecular proportions of an aliphatic aldehyde and substantially one molecular proportion of an isocyclic saturated ketone containing a six membered carbon ring.

16. The vulcanized rubber product produced by heating rubber and sulfur in the presence of a reaction product obtainable by reacting in the presence of an acid condensation agent substantially two molecular proportions of an aliphatic aldehyde and substantially one molecular proportion of a ketone having the formula of

wherein R may be alkyl or alkylene groups, said alkylene groups being joined to form an isocyclic six membered ring.

DAVID J. BEAVER.